(12) United States Patent
Garcia

(10) Patent No.: US 10,791,664 B2
(45) Date of Patent: Oct. 6, 2020

(54) WORK VEHICLE SUSPENSION HITCH

(71) Applicant: DEERE & COMPANY, Moline, IL (US)

(72) Inventor: Cesar Garcia, Monterrey (MX)

(73) Assignee: DEERE & COMPANY, Moline, IL (US)

( * ) Notice: Subject to any disclaimer, the term of this patent is extended or adjusted under 35 U.S.C. 154(b) by 112 days.

(21) Appl. No.: 16/029,154

(22) Filed: Jul. 6, 2018

(65) Prior Publication Data

US 2018/0310458 A1   Nov. 1, 2018

Related U.S. Application Data

(63) Continuation of application No. 15/159,483, filed on May 19, 2016, now Pat. No. 10,045,473.

(51) Int. Cl.
| | |
|---|---|
| *A01B 59/042* | (2006.01) |
| *A01D 34/64* | (2006.01) |
| *B60D 1/50* | (2006.01) |
| *A01D 101/00* | (2006.01) |
| *B60D 1/00* | (2006.01) |

(52) U.S. Cl.
CPC ............ *A01B 59/042* (2013.01); *A01D 34/64* (2013.01); *B60D 1/50* (2013.01); *A01D 2101/00* (2013.01); *B60D 2001/008* (2013.01)

(58) Field of Classification Search
CPC .. A01B 59/042; A01D 34/64; A01D 2101/00; B60D 1/50; B60D 2001/008
USPC ........................................................ 280/483
See application file for complete search history.

(56) References Cited

U.S. PATENT DOCUMENTS

| | | | |
|---|---|---|---|
| 2,238,095 | A | 4/1941 | Almcrantz |
| 2,458,666 | A | 1/1949 | Williams |
| 2,506,718 | A | 5/1950 | Grant |
| 2,702,501 | A * | 2/1955 | Simpson .............. A01B 59/042 172/272 |
| 4,903,781 | A * | 2/1990 | Smit .................... A01B 63/145 172/316 |
| 4,926,621 | A | 5/1990 | Tarras |
| 6,343,661 | B1 * | 2/2002 | Thompson ........... A01C 23/008 172/444 |
| 6,746,037 | B1 * | 6/2004 | Kaplenski ................ B60D 1/50 280/439 |
| 7,021,396 | B2 | 4/2006 | Steinberger et al. |
| 7,121,575 | B2 | 10/2006 | Finch |

(Continued)

OTHER PUBLICATIONS

Berti Macchine Agricole S.p.A , Agriculture Machines, Product Brochure, Admitted Prior Art.

(Continued)

*Primary Examiner* — Joseph M Rocca
*Assistant Examiner* — Felicia L. Brittman
(74) *Attorney, Agent, or Firm* — Tucker Ellis LLP

(57) ABSTRACT

A hitch assembly includes a vehicle connection interface and a rotary cutter connection interface. A mounting plate extends between the vehicle connection interface and the rotary cutter connection interface. A pivot plate is pivotally coupled to the mounting plate. A suspension element coupled between the pivot and mounting plates mitigates force transfer between the connection interfaces resulting from the relative movement of the connection interfaces.

20 Claims, 5 Drawing Sheets

(56) References Cited

U.S. PATENT DOCUMENTS

2004/0212176 A1* 10/2004 Colistro ................ B60D 1/075
  280/482
2013/0277943 A1* 10/2013 Wendte ................ B60D 1/363
  280/421

OTHER PUBLICATIONS

Bush Hog, 1812 Flex-Wing Rotary Cutters, Product Brochure, Admitted Prior Art.
John Deere, Rotary Cutters Standard-Duty, Mid Duty, Heavy Duty and Commercial Duty, Product Brochure, Admitted Prior Art.
Rhino, Flex-Wing Series, Web Page http://www.servis-rhino.com/product/new-flex-wing-series, Admitted Prior Art.
Schulte Industries Products, FLX-1510 Flex Arm, Web Page http://www.shulte.ca/product/rotary_cutters/flx1510_flex_arm2.html, Admitted Prior Art.
McCormick International, X10 Series Tractors, Product Brochure, McCormick by Woods Rotary Cutters, Admitted Prior Art.

* cited by examiner

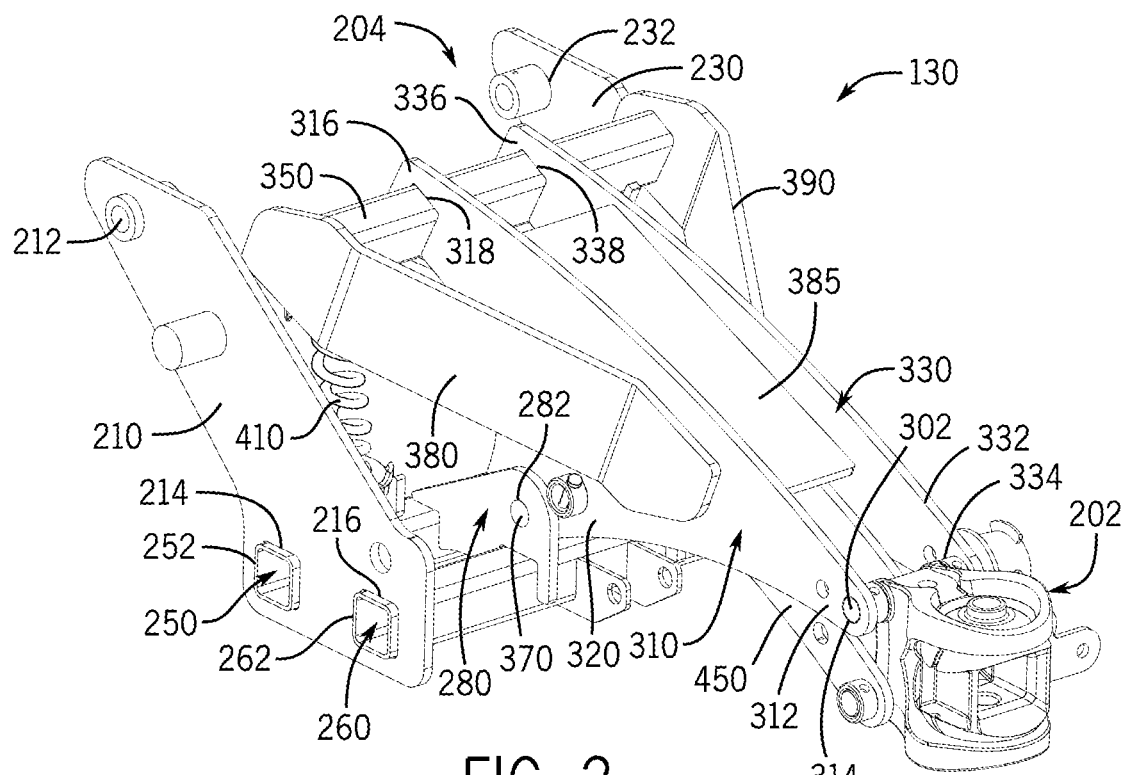

WORK VEHICLE SUSPENSION HITCH

CROSS-REFERENCE TO RELATED APPLICATION(S)

This application is a continuation of U.S. application Ser. No. 15/159,483, filed May 19, 2016, now allowed.

STATEMENT OF FEDERALLY SPONSORED RESEARCH OR DEVELOPMENT

Not applicable.

FIELD OF THE DISCLOSURE

This disclosure generally relates to work vehicles, and more specifically to hitch assemblies for towing implements.

BACKGROUND OF THE DISCLOSURE

In the agriculture, construction, and forestry industries, as well as other industries, work vehicles may utilize implements to perform particular tasks, such as for cutting, harvesting, tilling, and shredding, as the implement is towed behind the work vehicle. Such implements are coupled behind the work vehicle with a hitch assembly. As an example, a tractor may tow a rotary cutter with a hitch assembly during a cutting operation.

SUMMARY OF THE DISCLOSURE

The disclosure provides a hitch assembly for coupling an implement to a work vehicle.

In one aspect, the disclosure provides a hitch assembly for coupling a rotary cutter to a tractor. The hitch assembly has a vehicle connection interface configured to attach the hitch assembly to the tractor and a rotary cutter connection interface configured to attach the hitch assembly to the rotary cutter. A mounting plate extends between the vehicle connection interface and the rotary cutter connection interface. A pivot plate is pivotally coupled to the mounting plate. A suspension element coupled between the mounting plate and the pivot plate mitigates force transfer between the vehicle connection interface and the rotary cutter connection interface.

In another aspect, the disclosure provides a hitch assembly having a vehicle connection interface configured to attach the hitch assembly to the tractor and a rotary cutter connection interface configured to attach the hitch assembly to the rotary cutter. At least one mounting plate extends between the vehicle connection interface and the rotary cutter connection interface. At least one pivot plate is pivotally coupled to the at least one mounting plate. At least one suspension element coupled between the at least one pivot plate and the at least one mounting plate mitigates force transfer between the vehicle connection interface and the rotary cutter connection interface.

In yet another aspect, the disclosure provides a hitch assembly having a vehicle connection interface configured to attach the hitch assembly to the tractor and a rotary cutter connection interface configured to attach the hitch assembly to the rotary cutter. A first mounting plate and a second mounting plate extend between the vehicle connection interface and the rotary cutter connection interface. A first pivot plate and a second pivot plate are pivotally coupled to the first and second mounting plates. A first spring and a second spring are coupled between first and second mounting plates and the first and second pivot plates to mitigate force transfer between the vehicle connection interface and the rotary cutter connection interface.

The details of one or more embodiments are set forth in the accompanying drawings and the description below. Other features and advantages will become apparent from the description, the drawings, and the claims.

BRIEF DESCRIPTION OF THE DRAWINGS

FIG. 2 is a front isometric view of the hitch assembly of FIG. 1 in accordance with an example embodiment;

FIG. 3 is a rear isometric view thereof;

Like reference symbols in the various drawings indicate like elements.

DETAILED DESCRIPTION

Figure 1:
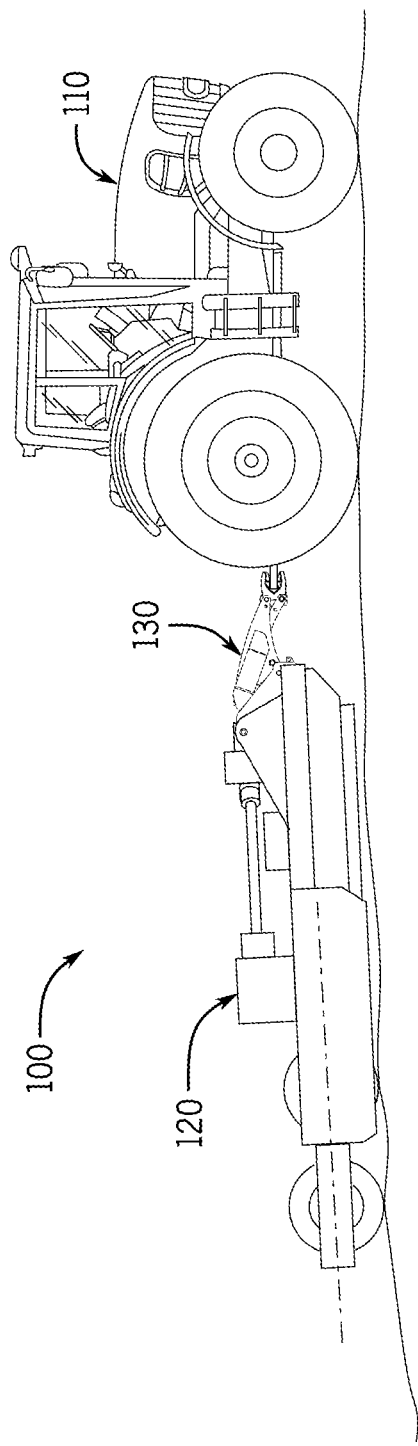
FIG. 1 is a side view of an example work vehicle train in the form of a rotary cutter coupled to a tractor with a hitch assembly in accordance with this disclosure.
Figure 4:
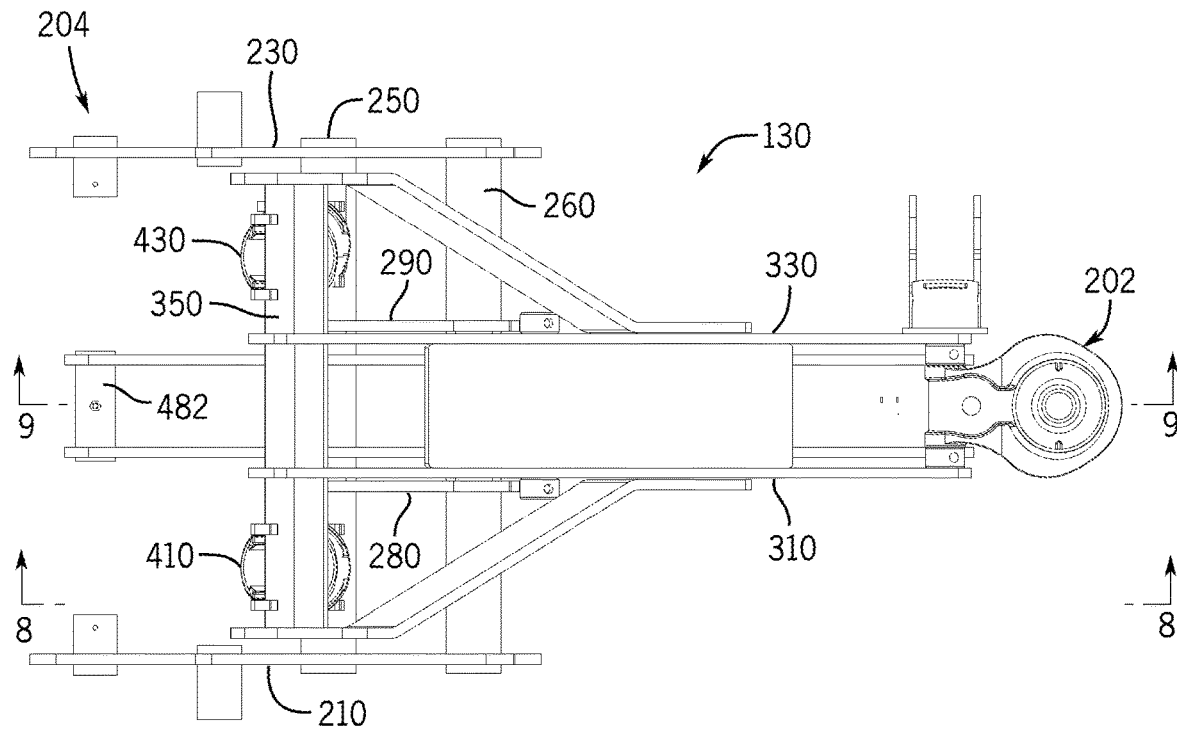
FIG. 4 is a top view thereof.
Figure 5:
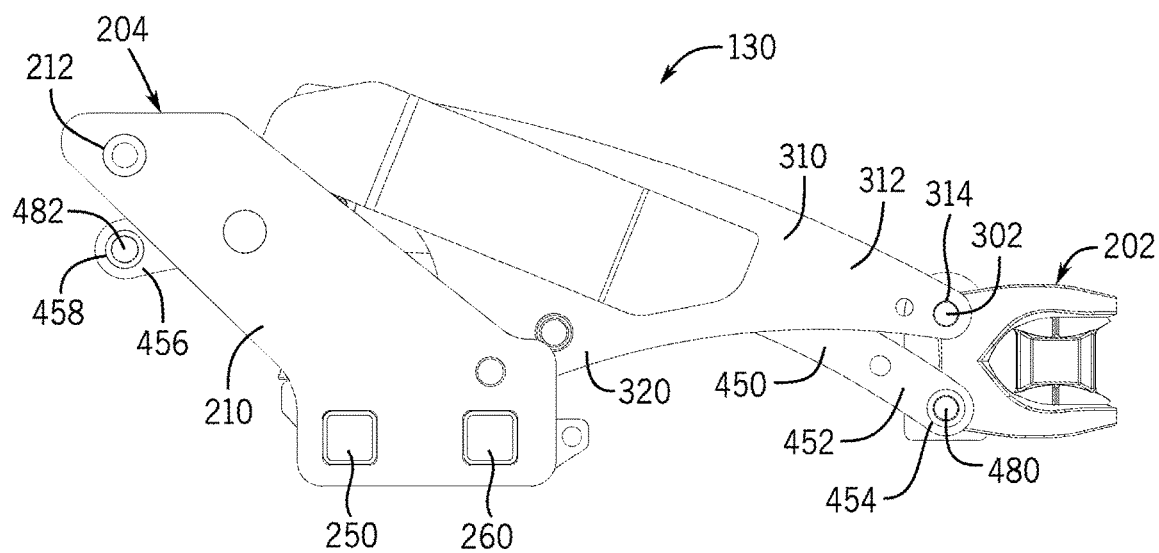
FIG. 5 is a side elevation view thereof.
Figure 6:
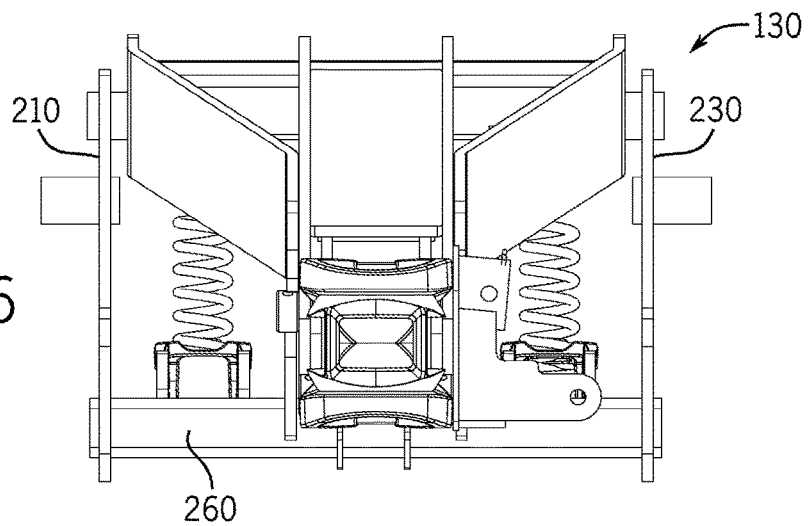
FIG. 6 is a front view thereof.
Figure 7:
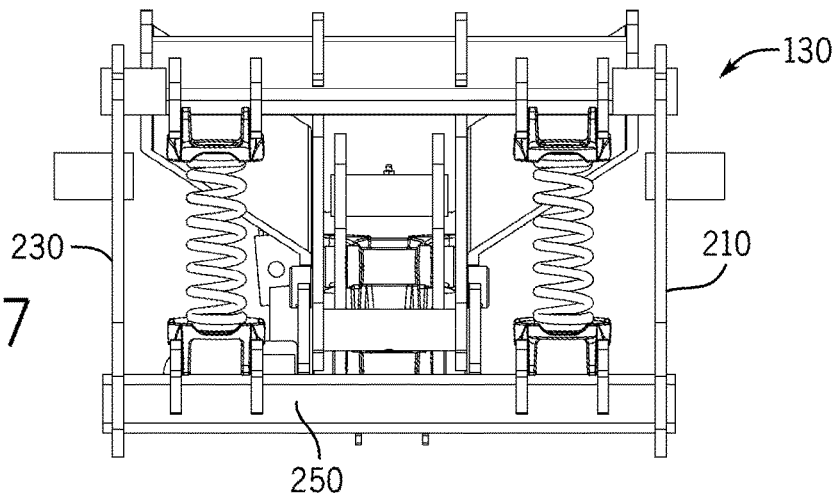
FIG. 7 is a rear view thereof.

The following describes one or more example embodiments of the disclosed hitch assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle or implement travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes.

Generally, a hitch assembly is used to couple a work implement to a work vehicle in a work vehicle train, typically for towing the implement behind the work vehicle to perform a task, such as mowing or harvesting. The effectiveness of the implement to perform this task may be compromised if the implement undergoes unnecessary vertical movements or imbalances relative to the ground. In a conventional arrangement, mitigating these movements may be a challenge since the vertical movement of the work vehicle is typically passed through the hitch assembly to the implement. For example, this may be an issue when the work vehicle traverses uneven ground. At times, vertical movement of the implement may be passed through the hitch assembly to the work vehicle, also resulting in undesirable issues, such as unnecessary wear or stresses. Conventional approaches generally attempt to address these issues by improving the suspension arrangements between the implement and the ground and/or between the work vehicle and the ground, which may result in increased weight, complexity, and cost.

Discussion herein may sometimes focus on the example application of a hitch assembly configured to couple a rotary cutter as the implement to a tractor as the work vehicle. In other applications, other configurations are also possible. In some embodiments, for example, the implement may be configured as a shredder, scraper, tillage equipment, harvesting or foraging equipment, and other type of agriculture, construction or forestry implement. Likewise, the work vehicle may also be configured as a truck, utility vehicle, or any type of propulsion vehicle.

The following describes one or more example implementations of the disclosed work vehicle trains with a hitch assembly coupling an implement to a work vehicle, as shown in the accompanying figures of the drawings described briefly above. Generally, the disclosed hitch assemblies (and work vehicle trains in which they are implemented) provide for improved mitigation of force transfer between the work vehicle and implement and associated improvements in implement performance as compared to conventional systems and arrangements.

Referring to FIG. 1, in some embodiments, the disclosed work vehicle train 100 may include a work vehicle 110, an implement 120, and a hitch assembly 130. As shown, the hitch assembly 130 functions to couple the implement 120 to the work vehicle 110 such that the work vehicle 110 may pull (e.g., tow) the implement 120 for transport or to perform a designated task. Generally, the work vehicle 110 provides the propulsion force to pull the implement 120 as the implement 120 performs the task, although in other configurations the work vehicle 110 may push the implement 120. In the depicted example, the work vehicle 110 is a tractor and the implement 120 is a rotary cutter and will be referred to below as such. However, the hitch assembly 130 may be used with any combination of work vehicle 110 and implement 120, as referenced above.

As represented in FIG. 1, the tractor 110 and rotary cutter 120 may travel over uneven terrain, including bumps and slopes (e.g., inclines, declines and side slopes). Such terrain may result in the tractor 110 and/or rotary cutter 120 undergoing a vertical movement or even oscillation. Unless otherwise addressed, relative vertical movement between tractor and rotary cutter may be problematic because forces resulting from the movement may be passed through the vehicle train. This may impact the effectiveness of the rotary cutter in performing the designated task. However, according to the examples herein, the hitch assembly 130 functions to prevent and/or mitigate vertical forces from being transferred from the tractor 110 to the rotary cutter 120 and from the rotary cutter 120 to the tractor 110.

The structure and operation of the tractor 110 and rotary cutter 120 are generally known and will not be described in detail. Additional details about the hitch assembly 130 will be provided below with reference to FIGS. 2-10.

FIGS. 2-10 show various views of the hitch assembly 130 removed from the tractor train 100 of FIG. 1 and will be referenced in the more detailed description of the hitch assembly 130 below. As noted above, the hitch assembly 130 is coupled to the tractor 110 and the rotary cutter 120 such that the tractor 110 may tow the rotary cutter 120. As such, the hitch assembly 130 is generally considered to include a vehicle connection interface 202 at a forward position and a rotary cutter connection interface 204 at a rear position.

In one example, the vehicle connection interface 202 is a clevis fastener with a clevis that receives a tang or draw bar (not shown) from the tractor 110 and secured by a pin (not shown). The vehicle connection interface 202 may have other configurations for attaching the hitch assembly 130 to the tractor 110. Similarly, the rotary cutter connection interface 204 may have any suitable arrangement. Additional details about one example of the rotary cutter connection interface 204 will be provided below.

In one example, the hitch assembly 130 includes first and second mounting plates 210, 230. The first and second mounting plates 210, 230 are arranged parallel to one another, respectively on the left and right lateral sides of the hitch assembly 130. On an aft end portion, each of the first and second mounting plates 210, 230 defines a rotary cutter mounting hole 212, 232. During assembly with the rotary cutter 120, the mounting holes 212, 232 receive one or more pins or cross-members (not shown) additionally secured to the rotary cutter 120 to couple the hitch assembly 130 to the rotary cutter 120. The rotary cutter mounting holes 212, 232 may also be provided with bushing elements to establish a pivotable connection between the hitch assembly 130 and the rotary cutter 120. The mounting holes 212, 232 may be considered at least a portion of the rotary cutter connection interface 204 for connecting the hitch assembly 130 to the rotary cutter 120.

At a bottom portion, the mounting plates 210, 230 additionally support first and second lateral cross members 250, 260. As shown, the cross members 250, 260 may be tubular with a generally square cross-sectional shape, although other shapes and configurations may be provided. The first lateral cross member 250 has a first end 252 secured in an aperture 214 in the mounting plate 210 and second end 254 secured in an aperture 234 in mounting plate 230, and the second lateral cross member 260 has a first end 262 secured in an aperture 216 in the mounting plate 210 and second end 264 secured in an aperture 236 in mounting plate 230. The cross members 250, 260 may be secured within the apertures 214, 216, 234, 236 in any suitable manner, such as welding.

The hitch assembly 130 further includes first and second mounting or pivot brackets 280, 290. The first pivot bracket 280 is shown in FIG. 1, and both pivot brackets 280, 290 are more clearly depicted in the two longitudinal cross-sectional views of FIGS. 8 and 9. The pivot brackets 280, 290 are mounted on the second lateral cross member 260 in between the mounting plates 210, 230. In the depicted example, the pivot brackets 280, 290 also extend to, and are supported by, the first lateral cross member 250. Additional information about the pivot brackets 280, 290 is provided below.

The hitch assembly 130 additionally includes first and second pivot plates 310, 330. The first and second pivot plates 310, 330 are generally parallel to one another and to the mounting plates 210, 230 and extend between the mounting plates 210, 230. As shown, the first and second pivot plates 310, 330 are coupled to the vehicle connection interface 202 at a forward position on the hitch assembly 130.

In particular, the first and second pivot plates 310, 330 have first or forward ends 312, 332 with apertures 314, 334 that receive a pin 302 to couple the pivot plates 310, 330 to the vehicle connection interface 202. This arrangement results in the ability of the vehicle connection interface 202 and pivot plates 310, 330 to at least partially rotate relative to one another. The apertures 314, 334 and/or pin 302 may include a bushing or similar arrangement to establish the pivotable connection between the pivot plates 310, 330 and vehicle connection interface 202, and thus, between the hitch assembly 130 and the tractor 110. In one example, the first and second pivot plates 310, 330 are coupled to the vehicle connection interface 202 at an upper portion of the vehicle connection interface 202.

The first and second pivot plates 310, 330 further include second ends 316, 336 opposite to the first ends 312, 332. The second ends 316, 336 define apertures 318, 338 that secure a third lateral cross member 350 extending between the pivot plates 310, 330. The third lateral cross member 350 is generally tubular with a square cross-sectional shape, although other arrangements may be provided. In one example, the first and second pivot plates 310, 330 are fixed to the cross member 350 by welding.

Figure 8:
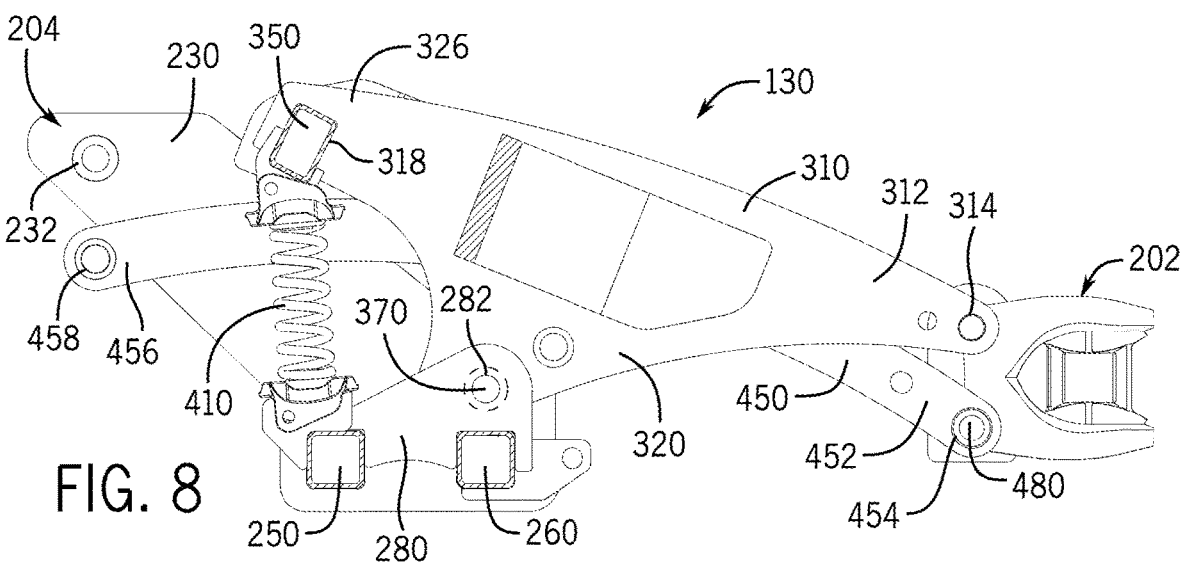
FIG. 8 is a cross-sectional view thereof taken through line 8-8 of FIG. 4.

The first pivot plate 310 additionally includes a pivot element 320 in between the first and second ends 312, 316. As best shown by FIG. 8, the pivot element 320 of the first pivot plate 310 may be in the form of a flange, protrusion, or any suitable shape. The pivot element 320 is mounted on the pivot bracket 280 in a manner that enables the pivot plate 310 to pivot relative to the pivot bracket 280. Similarly, the second pivot plate 330 additionally includes a pivot element 340 in between the first and second ends 332, 336. The pivot element 340 is mounted on the pivot bracket 290 in a manner that enables the pivot plate 330 to pivot relative to the pivot bracket 290.

In one example, the pivot elements 320, 340 of the pivot plates 310, 330 are coupled to the pivot brackets 280, 290 with a pivot pin or bar 370. In particular, the pivot bar 370 extends through an aperture 282 in pivot bracket 280, an aperture 322 in pivot element 320, an aperture 342 in pivot element 340, and an aperture 292 in pivot bracket 290. In one example, the pivot bar 370 is rotatably mounted in apertures 322, 342 and/or apertures 282, 292, thereby enabling the pivot plates 310, 330 to pivot relative to the pivot brackets 280, 290, as well as relative to the cross member 260 and mounting plates 210, 230. For example, the pivot bar 370 may be mounted in apertures 322, 342 and/or apertures 282, 292 with a bushing or similar arrangement to establish the pivotable connections. In this context, the pivot bar 370 and associated cooperating structures function as a break point for the hitch assembly 130.

The hitch assembly 130 may additionally include support members 380, 390. A first support member 380 extends from one side of the pivot plate 310 to a corresponding end of the cross member 350, and a second support member 390 extends from one side of the pivot plate 330 to a corresponding end of cross member 350. A center support plate 385 additionally extends between the pivot plates 310, 330. The support members 380, 390 and support plate 385 generally provide stability to the pivot plates 310, 330 during operation, as described in greater detail below.

As shown in FIG. 3, a first suspension element 410 and a second suspension element 430 are arranged between the cross member 250 extending between the mounting plates 210, 230 and the cross member 350 extending between the pivot plates 310, 330. For example, suspension mounting elements 412, 414 couple the suspension element 410 to the cross members 250, 350, and suspension mounting elements 432, 434 couple the suspension element 430 to the cross members 250, 350. In the depicted embodiment, the suspension mounting elements 412, 414, 432, 434 are U-shaped brackets that fix the suspension elements 410, 430 to the cross members 250, 350.

In one example, each suspension element 410, 430 is a coil spring or combination of springs (e.g., nested springs). In other examples, the suspension elements 410, 430 may include a piston cylinder arrangement, gas springs, shock absorbers, air bags, torsional springs, or any other mechanism suitable to absorb energy. Additional details about the function of the suspension elements 410, 430 are provided below.

The hitch assembly 130 further includes first and second attachment arms 450, 470. First ends 452, 472 of the attachment arms 450, 470 are coupled to the vehicle connection interface 202. For example, a pin 480 extends between apertures 454, 474 in the attachment arms 450, 470. In one example, the first and second attachment arms 450, 470 are coupled to the vehicle connection interface 202 at a lower portion of the vehicle connection interface 202. As a result of this arrangement, the attachment arms 450, 470 may pivot relative to the vehicle connection interface 202. As appropriate, the apertures 454, 474 and/or pin 480 may include a bushing arrangement to establish the pivotable connection.

Second ends 456, 476 of the attachment arms 450, 470 are coupled to the rotary cutter 120 (FIG. 1). For example, a pin 482 extends between apertures 458, 478 in the attachment arms 450, 470. As a result of this arrangement, the attachment arms 450, 470 may pivot relative to the rotary cutter 120 (FIG. 1). As appropriate, the apertures 458, 478 and/or pin 482 may include a bushing arrangement to establish the pivotable connection. In effect, the attachment arms 450, 470 and/or pin 482 may be considered part of the rotary cutter connection interface 204. As described below, the attachment arms 450, 470 provide a mechanism for maintaining the orientation of the vehicle connection interface 202 during relative vertical movement of the tractor 110 and rotary cutter 120.

Now that the structure of the hitch assembly 130 has been described, a more detailed description of operation of the hitch assembly 130 will be provided. During operation, the tractor 110 and/or rotary cutter 120 may be subject to relative vertical movement, such as when traversing uneven terrain. For example, when the tractor 110 drives over a bump, the tractor 110 may be forced upwards relative to the hitch assembly 130 and the rotary cutter 120; or when the tractor 110 drives over a hole, the tractor 110 may be forced downwards relative to the hitch assembly 130 and the rotary cutter 120. These actions may be repeated for the rotary cutter 120 relative to the hitch assembly 130 and tractor 110 when the rotary cutter 120 subsequently drives over the bump and hole. The hitch assembly 130 functions to absorb the energy of the relative movement to prevent or mitigate the resulting forces from traveling between the tractor 110 and rotary cutter 120.

Figure 10:
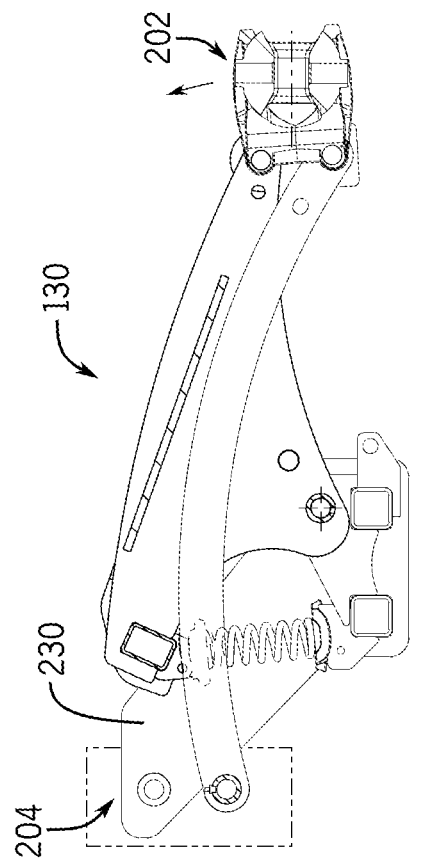
FIG. 10 is a cross-sectional view as shown in FIG. 9 albeit in a different orientation.
Figure 9:
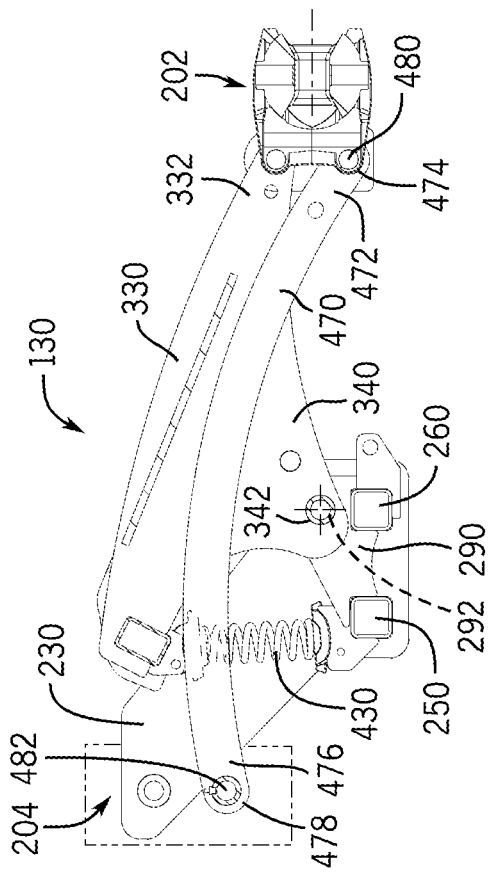
FIG. 9 is a cross-sectional view thereof taken through line 9-9 of FIG. 4.

One example of operation of the hitch assembly 130 during relative vertical movement of the tractor 110 is provided by a comparison of FIGS. 9 and 10. FIG. 9 depicts a cross-sectional view of the hitch assembly 130 in a normal position, and FIG. 10 depicts the same cross-sectional view of the hitch assembly 130 when the vehicle connection interface 202 forced upward as a result of the tractor 110 moving upward. When the vehicle connection interface 202 travels upward, the first ends 312, 332 of the pivot plates 310, 330 are pressed upward. As a result of the arrangement between the pivot elements 320, 340 of the pivot plates 310, 330 and the pivot brackets 280, 290, the pivot plates 310, 330 pivot about the pivot bar 370, which in turn results in a downward movement of the second ends 316, 336 of the pivot plates 310, 330 and the cross member 350. As the cross member 350 moves downward, the suspension elements 410, 430 are compressed against a counter structure, which in this arrangement is the cross member 250 coupled on the mounting plates 210, 230. In one example, the suspension elements 410, 430 function to absorb the energy resulting from the vertical movement of the tractor 110. Since the pivot plates 310, 330 pivot relative to the mounting plates 210, 230, and the suspension elements 410, 430 between the pivot plates 310, 330 and the mounting plates 210, 230 absorb the energy from this pivoting movement, at least a portion or all of the force resulting in vertical movement of the tractor 110 is prevented from being transferred to the rotary cutter 120. When the tractor 110 returns to the original position, the associated return of the vehicle connection interface 202 to the original position functions to pivot the pivot plates 310, 330 in an opposite direction, back into the original position.

As another example, when the tractor 110 is forced downward, the vehicle connection interface 202 on the hitch assembly 130 is also forced downward. When the vehicle connection interface 202 travels downward, the first ends 312, 332 of the pivot plates 310, 330 are pressed downward. As a result, the pivot plates 310, 330 pivot about the pivot bar 370, which in turn results in an upward movement of the second ends 316, 336 of the pivot plates 310, 330 and the cross member 350. As the cross member 350 moves upward, the suspension elements 410, 430 are extended to absorb the energy resulting from the vertical movement of the tractor 110. When the tractor 110 returns to the original position, the associated return of the vehicle connection interface 202 to the original position functions to pivot the pivot plates 310, 330 in an opposite direction, back into the original position.

A similar interaction occurs when the rotary cutter 120 moves relative to the tractor 110. For example, when the rotary cutter 120 is forced upward, the aft ends of the mounting plates 210, 230 are forced upward, thereby resulting in the mounting plates 210, 230 pivoting relative to the pivot plates 310, 330 and the energy being absorbed by the resulting compression of the suspension elements 410, 430. Further, when the rotary cutter 120 is forced downward, the aft ends of the mounting plates 210, 230 are forced downward, thereby resulting in the mounting plates 210, 230 pivoting relative to the pivot plates 310, 330 and the energy being absorbed by the resulting extension of the suspension elements 410, 430.

Accordingly, relative vertical movement of the tractor 110 and/or rotary cutter 120 is accommodated by pivoting the pivot plates 310, 330 relative to the mounting plates 210, 230 and absorbing the energy resulting from this movement. In other words, a portion of the kinetic energy of the movement is converted into heat in the suspension element, which is subsequently dissipated, and/or a portion the kinetic energy is returned by the suspension elements 410, 430 to the originating tractor 110 or rotary cutter 120 upon returning to the original position. The suspension elements 410, 430 additionally or alternatively function to absorb or dampen shock impulses that would otherwise result in vertical oscillations transferred back and forth between the tractor 110 and rotary cutter 120. Even if all of the energy is not absorbed, the hitch assembly 130 reduces the vertical amplitude that would otherwise result from such forces.

In some examples, the hitch assembly 130 is also configured to maintain the orientation of the vehicle connection interface 202 during the relative movement of the tractor 110 and/or rotary cutter 120. This operation is also depicted by a comparison of FIGS. 9 and 10. As shown, in one example, the first and second pivot plates 310, 330 are coupled to the vehicle connection interface 202 at an upper portion of the vehicle connection interface 202, and the first and second attachment arms 450, 470 are coupled to both the rotary cutter 120 (e.g., as part of the rotary cutter connection interface 204) and to a lower portion of the vehicle connection interface 202.

When the vehicle connection interface 202 moves upward, the forward ends 312, 332 of the pivot plates 310, 330 move upward, in a partially counter-clockwise direction as a result of the pivoting movement of the pivot plates 310, 330. During this movement, the attachment arms 450, 470 pull on the vehicle connection interface 202 to pivot the vehicle connection interface 202 relative to the pivot plates 310, 330. This results in the orientation or tilt of the vehicle connection interface 202 being maintained as the vehicle connection interface 202 moves up and down with the pivoting pivot plates 310, 330.

As a result, implementations may also be embodied as methods for operating a work vehicle train 100 coupled together with the hitch assembly 130 described above. For example, a method for operating a rotary cutter 120 may include attaching a first connection interface of a hitch assembly 130 to a tractor 110 and attaching a second connection interface of the hitch assembly 130 to the rotary cutter 120. The hitch assembly 130 may include any variation of the hitch assembly discussed above. The method further includes pulling the rotary cutter 120 with the tractor 110 via the hitch assembly 130 such that, upon encountering uneven terrain and relative vertical movement of the tractor 110, a pivot plate pivots relative to a mounting plate about a pivot element and at least one spring element absorbs at least a portion of a kinetic energy force resulting from the relative vertical movement, thereby at least partially maintaining a consistent cutting height for the rotary cutter 120.

Accordingly, the hitch assembly 130 reduces the impact of relative movement of the tractor 110 on the rotary cutter 120, and vice versa, particularly from uneven terrain such as bumps. This provides improved control and effectiveness for the rotary cutter 120 in performing a designated task, especially for a task that relies upon a consistent vertical position of the rotary cutter 120, such as a cutting operation. The hitch assembly 130 further provides decreased vertical forces on the rotary cutter 120 and/or tractor 110 as a result of preventing or mitigating relative force transfer, thereby improving durability. This enables enhanced stability and operator comfort.

The results of a comparison between an example hitch assembly 130 and a fixed hitch connection is provided by Table 1 below. Table 1 depicts the comparison in the context of amplitudes (in millimeters from a reference point) of vertical movement of the rotary cutter 120 as a result of uneven terrain. The amplitudes are provided for three tracks with varying types of uneven terrain that may be encountered by the entire vehicle train, the vehicle, and/or the implement. The amplitudes are also provided at different speeds, e.g., increasing speeds.

TABLE 1

|  | Track 1 | | Track 2 | | Track 3 | |
| --- | --- | --- | --- | --- | --- | --- |
|  | Fixed Hitch | Hitch Assembly | Fixed Hitch | Hitch Assembly | Fixed Hitch | Hitch Assembly |
| Speed 1 | 247 | 209 | 211 | 193 | 227 | 211 |
| Speed 2 | 293 | 180 | 373 | 233 | 318 | 217 |
| Speed 3 | 243 | 201 | 220 | 203 | 267 | 182 |

The results depicted in Table 1 demonstrate a substantial improvement in amplitude reduction for the rotary cutter as the train and tractor encounters uneven terrain. The resulting amplitude reduction is approximately 30%. This improvement is particularly advantageous in the context of a rotary cutter. Specifically, the performance of a rotary cutter is predicated upon the ability to make even cuts at a consistent height, and amplitude variations directly impede this purpose.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hitch assembly for coupling a rotary cutter to a tractor, the hitch assembly comprising:
   a vehicle connection interface configured to attach the hitch assembly to the tractor, the vehicle connection interface disposed at a forward position;
   a rotary cutter connection interface configured to attach the hitch assembly to the rotary cutter, the rotary cutter connection interface disposed at a rear position;
   a mounting plate extending between the forward position and the rear position;
   a pivot plate pivotally coupled to the mounting plate; and
   a suspension element disposed between the mounting plate and the pivot plate to mitigate force transfer between the vehicle connection interface and the rotary cutter connection interface.

2. The hitch assembly of claim 1, wherein the hitch assembly is configured to maintain an orientation of the vehicle connection interface during relative movement of the vehicle connection interface and the rotary cutter connection interface in a fore-aft direction by pivoting the vehicle connection interface relative to the pivot plate.

3. The hitch assembly of claim 2, wherein the pivot plate has a first end coupled to the vehicle connection interface and a second end coupled to the suspension element.

4. The hitch assembly of claim 2, further comprising:
   an attachment arm having a first end coupled to the vehicle connection interface and a second end forming at least a portion of the rotary cutter connection interface;
   wherein the first end of the attachment arm is pivotally coupled to the vehicle connection interface and the first end of the pivot plate is pivotally coupled to the vehicle connection interface.

5. The hitch assembly of claim 4, wherein the vehicle connection interface is a clevis having a first portion pivotally coupled to the first end of the pivot plate and a second portion spaced from the first portion and pivotally coupled to the first end of the attachment arm.

6. The hitch assembly of claim 1, wherein the mounting plate forms at least a portion of the rotary cutter connection interface.

7. The hitch assembly of claim 1, further comprising a second mounting plate.

8. The hitch assembly of claim 7, further comprising:
   a first cross member extending between the mounting plate and the second mounting plate;
   wherein the suspension element is mounted on the first cross member.

9. The hitch assembly of claim 8, further comprising:
   a second cross member extending between the mounting plate and the second mounting plate;
   wherein the pivot plate is pivotally mounted on the second cross member.

10. The hitch assembly of claim 9, further comprising a second pivot plate pivotally coupled to the second cross member.

11. The hitch assembly of claim 10, further comprising:
    a first pivot bracket and a second pivot bracket;
    wherein the first pivot bracket pivotally mounts the pivot plate on the second cross member and the second pivot bracket pivotally mounts the second pivot plate on the second cross member.

12. The hitch assembly of claim 11, further comprising:
    a third cross member extending between the pivot plate and the second pivot plate;
    wherein the suspension element extends between the third cross member and the first cross member.

13. The hitch assembly of claim 1, wherein the pivot plate is pivotally mounted to the mounting plate by a pivot bar.

14. A hitch assembly for coupling a rotary cutter to a tractor, the hitch assembly comprising:
    a vehicle connection interface configured to attach the hitch assembly to the tractor, the vehicle connection interface disposed at a forward position;
    a rotary cutter connection interface configured to attach the hitch assembly to the rotary cutter, the rotary cutter connection interface disposed at a rear position;
    at least one mounting plate extending between the forward position and the rear position;
    at least one pivot plate pivotally coupled to the at least one mounting plate; and
    at least one suspension element disposed between the at least one pivot plate and the at least one mounting plate to mitigate force transfer between the vehicle connection interface and the rotary cutter connection interface.

15. The hitch assembly of claim 14, wherein the hitch assembly is configured to maintain an orientation of the vehicle connection interface during relative movement of the vehicle connection interface and the rotary cutter connection interface in a fore-aft direction by pivoting the vehicle connection interface relative to the at least one pivot plate.

16. The hitch assembly of claim 15, wherein the at least one pivot plate has a first end coupled to the vehicle connection interface and a second end coupled to the suspension element.

17. The hitch assembly of claim 15, further comprising:
at least one attachment arm having a first end coupled to the vehicle connection interface and a second end forming at least a portion of the rotary cutter connection interface;
wherein the first end of the at least one attachment arm is pivotally coupled to the vehicle connection interface and the first end of the at least one pivot plate is pivotally coupled to the vehicle connection interface; and
wherein the vehicle connection interface is a clevis having a first portion pivotally coupled to the first end of the at least one pivot plate and a second portion spaced from the first portion and pivotally coupled to the first end of the at least one attachment arm.

18. The hitch assembly of claim 14, wherein the at least one mounting plate includes a first mounting plate and a second mounting plate;
wherein the at least one pivot plate includes a first pivot plate and a second pivot plate; and
wherein the at least one suspension element includes a first spring and a second spring.

19. The hitch assembly of claim 18, further comprising:
a first cross member extending between the first mounting plate and the second mounting plate on which the first spring and the second spring are mounted;
a second cross member extending between the first mounting plate and the second mounting plate on which the first pivot plate and the second pivot plate are pivotally mounted;
a third cross member extending between the first pivot plate and the second pivot plate to which couple the first spring and the second spring; and
a first pivot bracket and a second pivot bracket;
wherein the first pivot bracket pivotally mounts the first pivot plate on the second cross member and the second pivot bracket pivotally mounts the second pivot plate on the second cross member.

20. A hitch assembly for coupling a rotary cutter to a tractor, the hitch assembly comprising:
a vehicle connection interface configured to attach the hitch assembly to the tractor, the vehicle connection interface disposed at a forward position;
a rotary cutter connection interface configured to attach the hitch assembly to the rotary cutter, the rotary cutter connection interface disposed at a rear position;
a first mounting plate and a second mounting plate, the first and second mounting plates extending between the forward position and the rear position;
a first pivot plate and a second pivot plate, the first and second pivot plates pivotally coupled to the first and second mounting plates; and
a first spring and a second spring, the first and second springs respectively disposed between first and second mounting plates and the first and second pivot plates to mitigate force transfer between the vehicle connection interface and the rotary cutter connection interface.

* * * * *